(12) United States Patent
Karaoguz et al.

(10) Patent No.: US 8,797,943 B2
(45) Date of Patent: Aug. 5, 2014

(54) PROVIDING PRIVATE ACCESS POINT SERVICES IN A COMMUNICATION SYSTEM

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 639 days.

(21) Appl. No.: 12/327,265

(22) Filed: Dec. 3, 2008

(65) Prior Publication Data
US 2010/0135266 A1    Jun. 3, 2010

(51) Int. Cl.
*H04W 4/00*          (2009.01)
(52) U.S. Cl.
USPC .......................................... 370/328
(58) Field of Classification Search
USPC .............. 370/312, 338, 328, 310, 310.2, 332, 370/351, 389, 331, 333, 390
See application file for complete search history.

(56) References Cited

U.S. PATENT DOCUMENTS

| | | | |
|---|---|---|---|
| 6,874,018 B2 * | 3/2005 | Wu ............................... | 709/219 |
| 7,043,225 B1 * | 5/2006 | Patel et al. .................... | 455/405 |
| 2007/0008937 A1 * | 1/2007 | Mody et al. ................... | 370/338 |
| 2008/0031192 A1 * | 2/2008 | Narashimha et al. ......... | 370/331 |
| 2008/0175188 A1 * | 7/2008 | Kozisek ........................ | 370/328 |
| 2009/0164547 A1 * | 6/2009 | Ch'ng et al. .................. | 709/201 |
| 2009/0170547 A1 * | 7/2009 | Raghothaman et al. ...... | 455/522 |
| 2009/0190601 A1 * | 7/2009 | Kim et al. ..................... | 370/401 |
| 2010/0054219 A1 * | 3/2010 | Humblet et al. .............. | 370/338 |

\* cited by examiner

*Primary Examiner* — Anh Ngoc Nguyen
(74) *Attorney, Agent, or Firm* — Brinks Gilson & Lione

(57) ABSTRACT

A private access point may be utilized to establish a local network that is accessible by client devices when the client devices are communicatively coupled to the private access point. The private access point is then operable to determine services that may be provided in its local network to the client devices, and to advertise these services within its local network. The services comprise network and/or data accessibility, and bandwidth availability. Private access points are also operable to utilize local and/or remote resources to provide additional services, comprising audio/video processing capability, storage, and/or processing. Offering of services in private access point networks is incentivized to the private access points and/or to client devices. Incentives comprise offering pay and/or credit to the private access points. Providing access to, blocking, limiting and/or modifying available/offered services is managed in private access point networks, based on incentives and/or availability of resources.

20 Claims, 5 Drawing Sheets

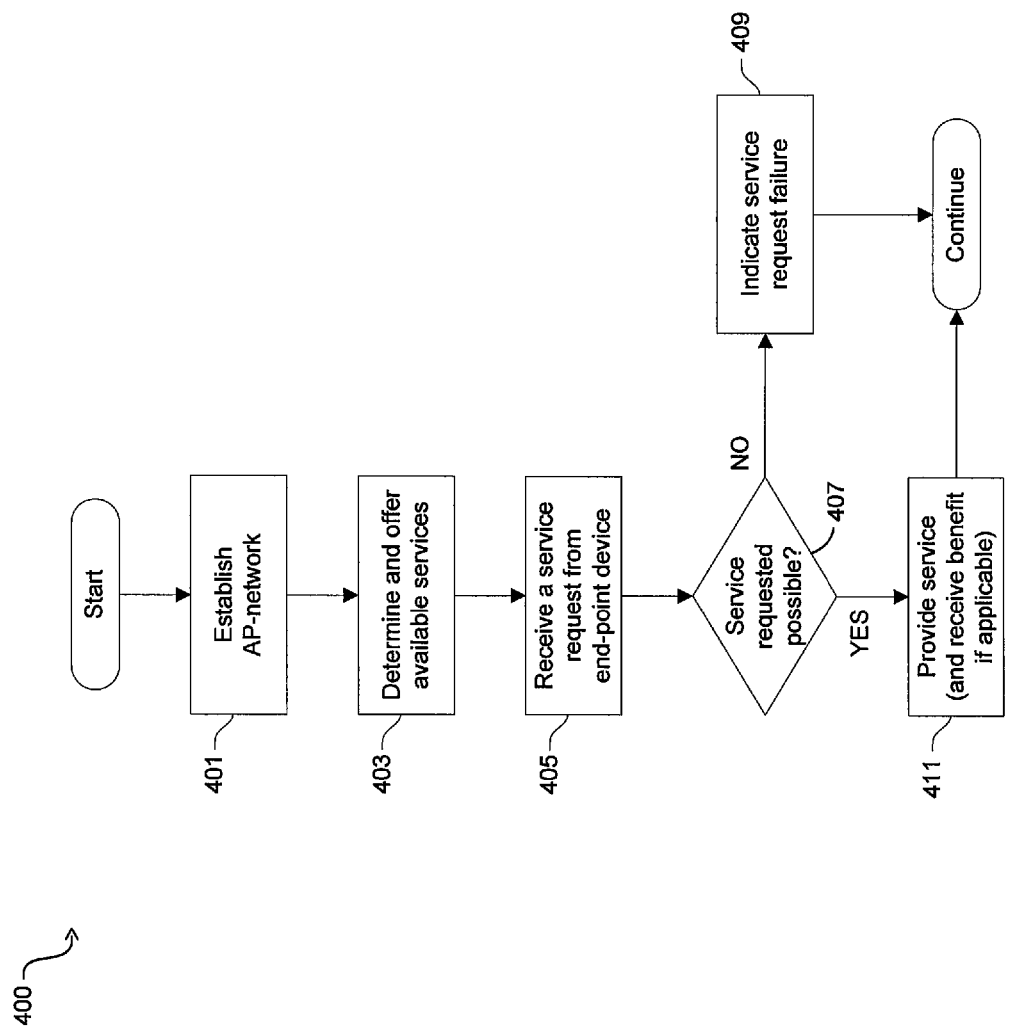

PROVIDING PRIVATE ACCESS POINT SERVICES IN A COMMUNICATION SYSTEM

CROSS-REFERENCE TO RELATED APPLICATIONS/INCORPORATION BY REFERENCE

This application makes reference to:
U.S. application Ser. No. 12/367,103 filed on Feb. 6, 2009;
U.S. application Ser. No. 12/367,142 filed on Feb. 6, 2009;
U.S. application Ser. No. 12/327,295 filed on even date herewith.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication. More specifically, certain embodiments of the invention relate to a method and system for providing private access point services in a communication system.

BACKGROUND OF THE INVENTION

The growth of system connectivity has been one of the major developments in recent years. Fewer and fewer systems are operating as a stand-alone system, and most of today's systems are increasingly becoming elements of one or more larger or complex networks. This growth in various networking technologies have provided improved performance and increased flexibility for these networks. Various wired and/or wireless based communication standards have been developed to satisfy demands for ever expanding system connectivity. The growth of system connectivity has also spurred a growth in applications that takes advantage of the benefits offered by the improved system connectivity, especially those having access to entities that provides improved processing and/or storage capabilities.

Communication end-point devices, which are mobile and/or stationary, comprise a plurality of wireless technologies to enable use of various interfaces for transmitting and/or receiving data. For example, mobile devices, which enable cellular connectivity, have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, CDMA2000, and LTE, incorporate substantial data capabilities. Most of today's mobile services comprise such features as text messaging, audio/video streaming, and web browsing. Modern mobile devices, for example cell phones and/or smart phones, are utilized to support additional services via other wireless interfaces, for example, wireless personal area networks (WPAN) and/or wireless local area network (WLAN) interfaces.

The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). An exemplary WPAN system utilizes a standardized technology such as Class 2 Bluetooth (BT) technology. While WPAN may be very beneficial for certain applications, other applications may require larger service areas and/or capabilities. To satisfy such needs, other technologies such as Wireless local area networks (WLAN) have been developed to provide greater wireless service. In contrast to the WPAN systems, WLAN provide connectivity to devices that are located within a slightly larger geographical area, such as the area covered by a building or a campus, for example.

WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system. Some WLAN systems are operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, mobile technology enables the use of the mobile phone as a form of wireless modem that allows connecting a laptop, for example, to the internet via a mobile network. More recently, Worldwide Interoperability for Microwave Access (WiMAX) based systems have become popular, and use of WiMAX to provide wireless connectivity is expanding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing private access point services in a communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a flow chart that illustrates an exemplary setup for providing private access point (AP) network servicing, in accordance with an embodiment of the invention.

DETAILED DESCRIPTION OF THE INVENTION

Certain embodiments of the invention may be found in a method and system for providing private access point services in a communication system. In various embodiments of the invention, private access points are operable to establish and service private access point networks. The private access points are operable to determine services that are available, via the corresponding private access point networks, to one or more user end-point client devices when the client devices are communicatively coupled to the private access points, via wired and/or wireless links. The services are based on network access, data accessibility and/or functionality available via the private access points. Available services are advertised in the private access point networks, via the private access points. The advertisement operations are performed via beacons and/or utilizing, for example, personalized markup language interfaces such as HTML, XML, and/or other suitable text, audio and/or video interfaces. Secondary devices and/or systems, external to and/or remote from the private access points, are operable to advertise and/or offer content or functionality via the advertising functionality in the private access points. The private access points are also operable to utilize local and/or remote resources to provide additional services, including, for example, audio and/or video processing capability, storage, and/or processing. The offering and/or requesting of services in the private access point networks is incentivized to the private access points and/or to the client devices. The private access points are operable to request and/or receive pay and/or credit for providing services. Accounts corresponding to the client devices may also be debited based on services received via the private access point networks. Servicing operations in the private access point networks may be supported and/or managed by network service providers, via operator support servers for example. The operator support servers enable managing, for example, user accounts and/or network accessibility provided via the private access point networks, and/or managing crediting/billing operations based on servicing operations in the private access point networks.

Figure 1:
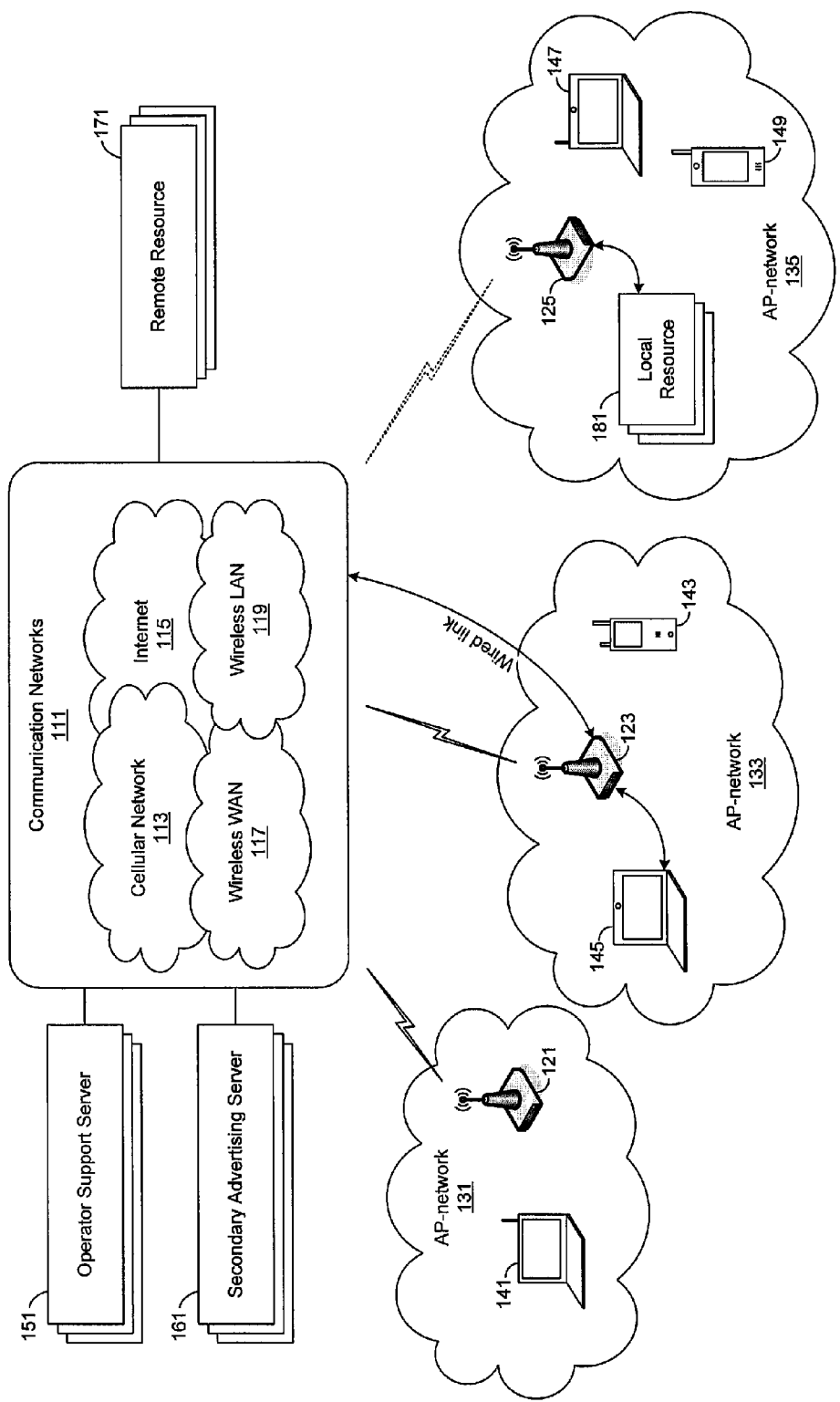
FIG. 1 is a block diagram that illustrates an exemplary system for providing services via private access point networks, in accordance with an embodiment of the invention.

FIG. 1 is a block diagram that illustrates an exemplary system for providing services via private access point networks, in accordance with an embodiment of the invention. Referring to FIG. 1, there is shown a plurality of communication networks 111, a cellular network 113, Internet 115, wireless wide area network (WWAN) 117, a wireless local area network (WLAN) 119, and access point spot (AP-Spot) servicing devices 121, 123, and 125. FIG. 1 also shows private AP networks 131, 133, and 135, communication devices 141, 143, 145, 147, and 149, one or more operator support servers 151, one or more secondary advertising servers 161, one or more remote resource 171, and one or more local resources 181.

The plurality of communication networks 111 comprises one or more networks that are operable to enable wireless and/or wired communication among a plurality of local and/or remote entities. The network connectivity available via the plurality of communication networks 111 is based on one or more communication standards and/or protocols. The plurality of communication networks 111 comprises, for example, the cellular network 113, the Internet 115, the WWAN 117, and/or the WLAN 119. The cellular network 113 comprises suitable logic, circuitry and/or code that may enable communication via one or more cellular technologies. Exemplary cellular technologies comprise CDMA, WCDMA, CDMA1000, HSDPA, GSM, GPRS, EDGE, and/or UMTS. The cellular network 113 comprise, for example, a plurality of control and/or switching nodes, and a plurality of base stations that enable transmission and/or reception of cellular based communications between the cellular network 113 and cellular capable devices.

The Internet 115 comprises a system of interconnected networks to enable exchange of data between a plurality of nodes, based on one or more networking standards, including, for example, the Internet protocol (IP). For example, the Internet 115 enables connectivity among a plurality of private and public, academic, business, and/or government nodes and networks. The physical connectivity is provided in the Internet 115, for example, via the Public Switched Telephone Network (PSTN), via copper wires, fiber-optic cables, wireless interface, and/or other standards-based interfaces. The transport functionality is performed in the Internet 115, for example, based on one or more protocols, including, for example, the TCP/IP protocol.

The WWAN 117 comprises suitable logic, circuitry and/or code that enable implementation of one or more wireless wide network area standards and/or protocols. Exemplary wireless wide network area technologies comprise, for example, WiMAX based networks. The WLAN 119 comprises suitable logic, circuitry and/or code that enable implementation of one or more wireless local network area standards and/or protocols. Exemplary wireless local network area technologies comprise, for example, 802.11 based standards, including, for example, WiFi based networks.

Each of the communication devices 141, 143, 145, 147, and 149 comprises a personal end-point device and/or system that is operable to enable performing tasks and/or applications requested via users of the communication devices. In an exemplary aspect of the invention, the communication devices 141, 143, 145, 147, and 149 are operable to communicate with one or more the AP servicing devices 121, 123, and/or 125 to form communication pathways that support one or more applications originating and/or terminating in the communication devices. Exemplary devices comprise PDAs, Smart phones, laptops and/or other PCs that are operable to enable utilizing one or more wired and/or wireless communication interface. Exemplary wireless and/or wired interfaces comprise, for example, WiFi, Bluetooth and/or other personal area network (WPAN) based interfaces, USB, and/or proprietary inter-device standards based interfaces.

Each of the AP servicing devices 121, 123, and 125 comprises a privately owned and/or operated communication device that is dedicated to establish and/or service of the private AP networks 131, 133, and 135. Each of the AP servicing devices 121, 123, and/or 125 comprises suitable logic, circuitry and/or code that enable performing network setup, management, and/or control operations, within the private AP networks 131, 133, and/or 135. Additionally, and to facilitate providing network accessibility servicing via private AP networks, the AP servicing devices 121, 123, and/or 125 are operable to enable network connectivity to one or more of the communication networks 111, via one or more wireless and/or wired interfaces. For example, each the AP servicing devices 121, 123, and 125 may be operable to utilize cellular links, Ethernet links, WiMAX links, and/or 802.11 links to enable establishing network connectivity via cellular network 113, the Internet 115, the WWAN 117, and/or the WLAN 119.

The operator support server 151 comprises suitable logic, circuitry, and/or code that enable providing and/or managing network accessibility. The operator support server 151 is utilized, for example, by service providers to enable providing access to one or more of the plurality of communication networks 111 to a plurality of users. The operator support server 151 is operable to enable management of user accounts and/or network access during operations of the AP servicing devices 121, 123, and/or 125. The operator support server 151 is also operable to manage user accounts and/or network access during operations of the communication devices 141, 143, 145, 147, and/or 149. The secondary advertising server 161 comprises suitable logic, circuitry, and/or code that enable providing supporting and/or supplementing advertising operations in the private AP networks 131, 133, and/or 135; via the AP servicing devices 121, 123, and/or 125.

Each of the remote resources 171 comprises suitable logic, circuitry and/or code that enable supporting services provided via AP servicing devices. The remote resource 171 is operable, for example, to provide processing and/or storage operations that are unavailable directly via the AP servicing devices 121, 123, and/or 125, but which are necessary to facilitate providing servicing operations in the private AP networks 131, 133, and/or 135. The invention is not limited to a specific device, and may comprise, for example, a general purpose processing device, a specialized processing device, a specialized peripheral device, or any combination of suitable hardware, and/or code, that is enabled to perform a task requested via the AP servicing devices 121, 123, and/or 125. The remote resource 171 also comprises functionality to enable remote communication with private AP servicing devices; via the one or more the communication networks 111 for example.

The remote resources 171 may comprise, for example, a home PC that comprises improved processing subsystems and/or increased memory space, which may be utilized to store and/or retrieve media streams that are offered in the private AP network via the AP servicing devices. The local resource 181 comprises suitable logic, circuitry and/or code that support servicing operations provided via AP servicing devices. The local resource 181 is substantially similar to the remote resource 171, and is also operable to provide, for example, processing and/or storage operations that are unavailable directly in the AP servicing devices but are necessary to servicing operations in private AP networks. The local resource 181, however, is operable to enable local and/or direct communication with private AP servicing devices, via one or more wired and/or wireless links that are available via the AP servicing devices. For example, the local resources 181 comprise a portable PC, a laptop for example, which is operable to communicate with the AP servicing device 125, via WiFi and/or Ethernet crossover cable, to enable storage and/or retrieval of media streams that are offered in the private AP network 135 via the AP servicing device 125.

In operation, the AP servicing devices 121, 123, and/or 125 enable establishing the private AP networks 131, 133, and/or 135, respectively. The private AP networks represent, for example, localized networks wherein user end-point devices present within operational proximity of the AP servicing devices may establish connectivity with the AP servicing devices to request and/or receive services available in the private AP network. For example, the AP servicing device 125 may establish the private AP network 135, wherein a plurality of services, provided via the AP servicing device 125, may be made available in the private AP network 135.

The services provided via the private AP networks comprise, for example, network accessibility. For example, the AP servicing device 123 is communicatively coupled to one or more of the plurality of the communication networks 111, via one or more wired and/or wireless links. Connectivity of the AP servicing device 123 is established, for example, via a WiMAX link, a cellular link, an 802.11 link, and/or an Ethernet based and/or fiber optical cable wired connection. The communication devices 143 and/or 145 request network connectivity through the private AP network 133, via the AP servicing device 123. In instances where the communication devices 143 and/or 145 have no direct network access to the plurality of communication networks 111, these devices are operable to establish, instead, connections with the AP servicing device 123, to gain network access, via the network connectivity of the AP servicing device 125. The connection between the communication device 143 and the AP servicing device 123 may be setup via a wireless connection, over Bluetooth and/or WiFi links for example. The connection between the communication device 145 and the AP servicing device 123 may be setup and/or via a wired connection such as an Ethernet crossover cable, for example.

The services provided via the private AP network 135 comprise, for example, network accessibility. For example, the AP servicing device 125 may be connected to one or more of the plurality of the communication networks 111, via one or more wired and/or wireless links. AP servicing device 125 connectivity is established, for example, a WiMAX wireless link, a cellular link, an 802.11 link, via Ethernet based wired connection, and/or fiber optical cables. Accordingly, the communication devices 147 and/or 149 may request network connectivity through the private AP network 135, via the AP servicing device 125. For example, the communication device 147 may lack any direct network access to the plurality of communication networks 111. The communication device 147 establishes, instead, a connection with the AP servicing device 125, to gain network access, via the AP servicing device 125's network connectivity. The connection between the communication device 147 and the AP servicing device 125 may be setup via wireless connection, over Bluetooth link for example, and/or via wired connection, via Ethernet crossover cable for example. Network connectivity of the AP servicing device 123 is also utilized when the requesting device has some network access of its own. For example, in instances where network connectivity of the communication device 143 is limited to 802.11 links, network access through the AP servicing device 123, via WiMAX and/or cellular 3G links, for example, is deemed more desirable, due to higher bandwidth, quality of service (QOS), and/or network performance.

Other services, in addition to network accessibility, may be available via private AP networks. Local and/or remote resources are operable to provide additional services in the private AP networks, via the AP servicing devices. For example, the AP servicing device 121 is operable to offer, via the private AP network 131, services based on data and/or functionality available via one or more of the remote resource 171. These services may also be available where the private AP networks are inoperable to provide network access. For example, in instance where network connectivity, to the plurality of communication networks 111 for example, is lost, the AP servicing device 123 is operable to offer, via the private AP network 133, services based on data and/or functionality available locally, via one or more of the local resource 181. The communication devices 143 and/or 145 are operable, for example, to connect to the AP servicing device 123, via WiFi links for example, to request and/or retrieve video and/or audio streams that are stored in and/or played from local resource 181, via the AP servicing device 123.

In an exemplary aspect of the invention, private AP network servicing operations are incentivized. In this regard, the private AP servicing operations is incentivize to the AP servicing devices, for example, by enabling them, and/or their users, to receive and/or claim compensation, pay and/or credit for provide private AP services. The credit received for provide private AP network servicing is utilized, for example, to compensate for costs otherwise charged by service provider when the AP servicing devices are utilized to access networks operated by the service providers. The user accounts corresponding to the devices utilizing the private AP network servicing operations may be adjusted to bill and/or debit their users for services provided via the private AP networks. The operator support server 151 is operable, for example, to manage accounts corresponding to the AP servicing device 123 and/or the communication devices 143 and/or 145. Accordingly, the AP servicing device 123 is operable to request credit and/or billing adjustments for servicing the communication devices 143 and/or 145, via the operator support server 151. In instances where the operator support server 151 does not directly manage the user account for either of the devices receiving and/or providing private AP services, the operator support server 151 communicates directly with other operator support servers to facilitate exchange of required user related information, to enable performing necessary billing and/or crediting adjustments. Alternatively, a centralized depository is utilized to enable indirect exchange of user related information by instances of the operator support server 151.

The private AP servicing operations are also incentivized to the requesting devices. For example, private AP services may be preferred because the private AP networks offer network accessibility, improved bandwidth, and more suitable content, functionality and/or networking capabilities. In an exemplary aspect of the invention, the communication devices and the AP servicing devices are operable to negotiate incentivized arrangements, to enhance servicing incentives with regard to the requesting communication devices, the AP servicing devices, and/or service providers. For example, where the AP servicing device 121 is only offering 10% of its available network bandwidth for networking accessibility in the private AP network 131, the communication device 141 is operable to negotiate with the AP servicing device 121 for allocation of 20% of the available bandwidth in exchange for larger credit and/or higher pay.

The private AP network is operable to enable advertisement operations. For example, the AP servicing devices 121, 123, and/or 125 may be operable to transmit service beacons. In addition to providing information that enable identifying and/or locating the private AP networks 131, 133, and/or 135, the beacons also comprise information advertising the services available in the private AP networks. In an exemplary aspect of the invention, the AP servicing devices 121, 123, and/or 125 are also operable to utilize user-interface communication functionality. The user-interface communication functionality is operable, for example, to enable user-friendly interactions between the AP servicing devices 121, 123, and/or 125, and communication devices in the private AP networks 131, 133, and/or 135. The user-interface communication functionality is also operable to enable advertising and/or configuring services available in the corresponding private AP networks 131, 133, and/or 135. The AP servicing devices 121, 123, and/or 125 are operable, for example, to utilize personalized markup language interfaces, comprising, for example, HTML, XML, and/or other suitable text, audio and/or video interfaces.

In an exemplary aspect of the invention, the personalized interface is utilized to create and/or manage advertising and/or servicing webpages during interactions between servicing devices and requesting devices. Accordingly, the personalized interface enables users of the communication devices 141, 143, 145, 147, and/or 149, for example, to conveniently communicate with the AP servicing devices to inquire about available services, and/or to request and/or receive services, for example media stream downloads. The personalized interfaces are also operable to enable performing incentivizing operations, including, for example, enabling the devices to negotiate and/or throttle bandwidth allocation. The AP servicing devices 121, 123, and/or 125 are operable to enable secondary devices and/or systems, which are external to and/or remote from the servicing devices, to utilize their personalized interface functionality. For example, the secondary advertising server 161 is operable to create it own advertising webpage, and push the webpage via the personalized interfaces of AP servicing devices 121, 123, and/or 125, to offer content and/or functionality available, directly or indirectly, via the secondary advertising server 161.

Figure 2A:
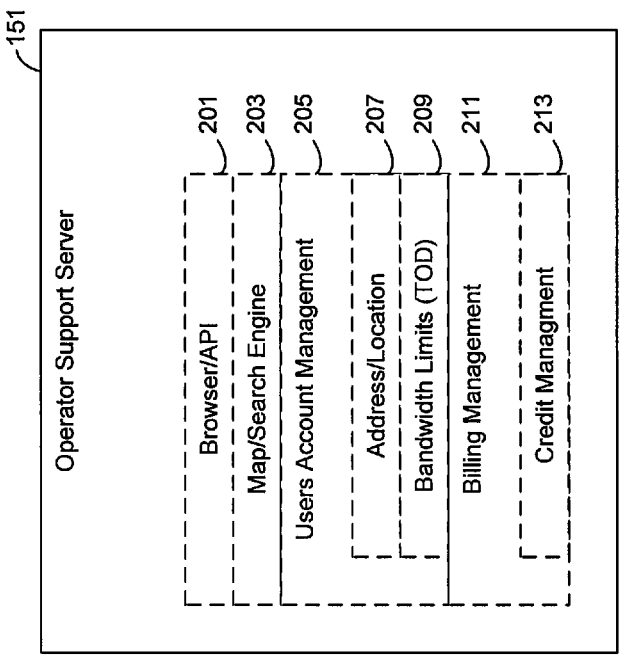
FIG. 2A is a block diagram that illustrates an exemplary operator support server that supports use of private access point networks, in accordance with an embodiment of the invention.

FIG. 2A is a block diagram that illustrates an operator support server that supports use of private access point networks, in accordance with an embodiment of the invention. Referring to FIG. 2A, there is shown the operator support server 151, a browser/application programming interface (browser/API) entity 201, a map/search engine 203, a users account management 205, an address/location function 207, a bandwidth limitation function 209, a billing management 211, and a credit management function 213.

The operator support server 151 is substantially as described with respect to FIG. 1. In an exemplary embodiment of the invention, the operator support server 151 comprises a plurality of constituent functional entities to enable supporting private AP network services. The operator support server 151 comprises, for example, the browser/API entity 201, the map/search engine 203, the users account management 205, and the billing management 211.

The browser/API entity 201 comprises suitable logic and/or code operable to enable communication between the operator support server 151 and other devices and/or systems. The browser/API entity 201 is operable, for example, to enable communication of messaging pertaining to support and/or management of private AP network services and/or to enable communication pertaining to user accounts, to request, for example, crediting and/or billing adjustments for one or more users serviced via the operator support server 151. The browser/API entity 201 is operable to enable supporting messaging that is based on application programming interface (API) which is specific to a functionality running in the operator support server 151 and is supported in devices communicating with the operator support server 151. Alternatively, the browser/API entity 201 is operable to enable, for example, remote access and/or communication based on an HTTP based browsing interface. Accordingly, the browser/API entity 201 enables running an HTTP based server functionality via the operator support server 151 that enable establishing peer-to-peer connection with HTTP based client functionality running in the requesting device. In an exemplary aspect of the invention, the browser/API entity 201 is also operable to enable communication among a plurality of the operator support server 151, directly and/or indirectly via centralized depositories, during exchange of user account information, for example, for the purpose of performing crediting and/or billing operations.

The map/search engine 203 comprises suitable logic, circuitry and/or code that enable mapping specified locations to one or more devices operated and/or managed via the operator support server 151. The operator support server 151 is operable, for example, to receive requests for listing of private AP networks, and/or services available via the private AP networks, based on a specified location. The map/search engine 203 is operable to enable determining and communication information pertaining to private AP servicing devices based on the location of the requesting device. The determination of private AP servicing devices that are reported back is based on a plurality of factors, comprising, for example, suitability to provide services based on operational proximity of the devices and/or other conditions including, for example, specified services and/or parameters of services.

The user account management 205 comprises suitable logic, circuitry and/or code that enable management of user related information. The user account management 205 is utilized, for example, to enable setting up, storing, maintaining and/or updating user's network access related information. The user account management 205 may enable, for example, creation and/or maintenance of access information that enable identifying and/or authenticating users seeking to access one or more communication networks that are manageable via the operator support server 151, directly and/or via private AP network services. The user account management 205 is operable, for example, to perform user authentication based on SIM challenge wherein the SIM based information provided by communication devices are compared to stored information. The access information comprises various types of information, including, for example, user identifiers, user passwords, and/or location and/or addressing related information for devices used by users managed by the operator support server 151. At least some of access information is provided directly by the operator support server 151. To enable performing the various user account related operation, dedicated sub-entities are utilized within the user account management 205. For example, the address/location functionality 207 comprises functionality that enables creating, managing, and/or modifying users location related information.

The address/location function 207 comprises suitable logic, circuitry and/or code operable to enable, for example, performing necessary mapping operations via the map/search engine 203. In an exemplary aspect of the invention, users' location information may also be generated and/or updated in the address/location functionality 207 during mapping operations in the map/search engine 203.

The bandwidth limitation function 209 comprises suitable logic, circuitry and/or code that comprises functionality that enables creating, managing, and/or modifying users bandwidth related information. The bandwidth limitation functionality 209 is operable, for example, to enable tracking bandwidth available, and applicable constraint thereof, via private AP servicing devices during private AP network servicing operations.

The billing management function 211 comprises suitable logic, circuitry and/or code that enable management of billing information via the operator support server 151. For example, the billing management 211 comprises functionality that enables setting up, storing, maintaining and/or updating users' billing information as it pertains to network accessibility provided via one or more communication devices that are supported and/or managed via the operator support server 151. In an exemplary aspect of the invention, the billing management 211 is operable to enable performing billing functionality related to private AP network servicing operations. For example, the billing management 211 is operable to enable billing user accounts corresponding to one or more of the communication devices 141, 143, 145, 147, and/or 149 when requesting and/or receiving services via the private AP networks 131, 133, and/or 135. The credit management 213 comprises functionality that is operable to perform crediting functions related to private AP network servicing operations. For example, the credit management 213 is operable to enable crediting users' accounts corresponding to one or more of the private AP servicing devices 121, 123, and/or 125 when providing services via the private AP networks 131, 133, and/or 135. The private AP based billing and/or crediting operations are performed via the billing management 211 and/or the credit management 213 based on messaging between the operator support server 151 and the requesting device, and/or based on messaging among a plurality of instances of the operator support server 151, substantially as described with regard to, for example, FIG. 1.

In operation, the browser/API entity 201, the map/search engine 203, the users account management 205, the address/location function 207, the bandwidth limitation function 209, the billing management 211, and/or the credit management function 213 are utilized to enable use of the operator support server 151 to manage and/or support private AP servicing operations via the private AP networks 131, 133, and/or 135. For example, the browser/API entity 201 is utilized to enable private AP servicing devices and/or requesting communication devices to communicate with the operator support server 151. The user account management 205, the address/location function 207, the bandwidth limitation function 209 are utilized to validate and/or manage users accounts and/or network access limitations and/or requirements. The map/search engine 203 and/or the address/location function 207 are utilized to provide mapping functionality that is utilized, for example, to enable communication devices to locate nearby private AP servicing devices. The billing management 211 and/or the credit management function 213 are utilized to enable performing billing/crediting operation that enable billing serviced communication devices and/or crediting and/or paying private AP servicing devices for services provided via private AP networks.

Figure 2B:
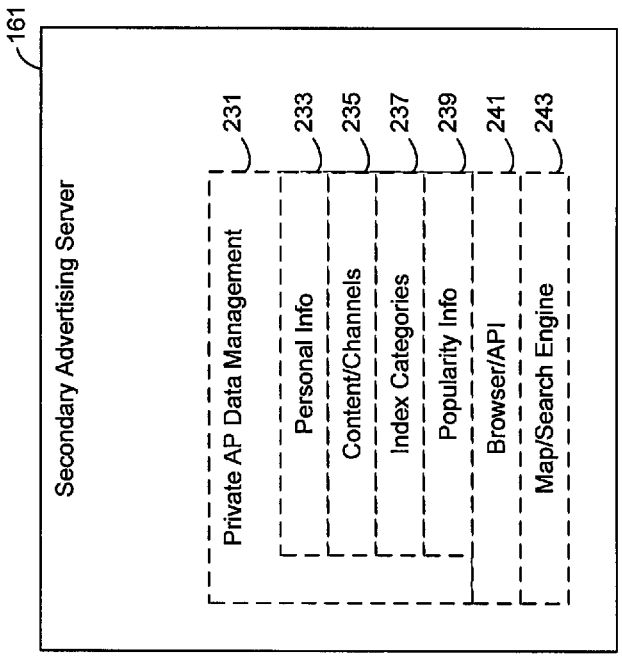
FIG. 2B is a block diagram that illustrates an exemplary advertising server that supports use of private access point networks, in accordance with an embodiment of the invention.

FIG. 2B is a block diagram that illustrates a secondary advertising server that supports use of private access point networks, in accordance with an embodiment of the invention. Referring to FIG. 2B, there is shown the secondary advertising server 161, a private AP data management 231, a personal info entity 233, a content/channels entity 235, an index/categories entity 237, a popularity info entity 239, a browser/application programming interface (browser/API) entity 241, and a map/search engine 243.

The private AP data management 231 comprises suitable logic, circuitry and/or code that enable management of advertising operations performed via private AP networks. The private AP data management 231 is utilized, for example, to enable creating webpage experience that is operable to communicate with, and/or advertise to users of communication devices serviced via private AP networks.

The personal info entity 233 is comprises suitable logic, circuitry and/or code operable to enable creating, storing, and/or updating information pertaining to particular users that is relevant to the personalization of webpages for example. This information comprises, for example, access validation information, accounting related information, bandwidth limitations, and/or location/mapping related information. The content/channels entity 235 comprises suitable logic, circuitry and/or code operable to enable creating, storing, and/or updating information that pertains to the contents that is offered via the advertised webpages, via the secondary advertising server 161. The index categories entity 237 comprises suitable logic, circuitry and/or code operable to create, store, and/or manage indexing of information and/or content available via the secondary advertising server 161. For example, the index categories entity 237 is operable to enable the private AP servicing device 123 to locate and access information that are utilized in advertising services and/or content to communication devices serviced via the private AP network 133. The popularity info entity 239 comprises suitable logic, circuitry and/or code operable to track, for example, current activity by users of communication devices, via the private AP networks, in order to predict potential future interests, to better optimize advertisement operations in the secondary advertising server 161, for example.

The browser/API entity 241 is substantially similar to the browser/API 201, as described with regard to, for example, FIG. 2A. The browser/API entity 241 is operable, for example, to enable communication between the secondary advertising server 161 and private AP servicing devices, for example one of the private AP servicing devices 121, 123 and 125, to enable providing remote advertising functionality via the private AP servicing devices during private AP network servicing operations.

The map/search engine 243 is substantially similar to the map/search engine 203, as described with regard to, for example, FIG. 2A. The map/search engine 243 is operable, for example, to enable communication between the secondary advertising server 161 and private AP servicing devices, for example one of the private AP servicing devices 121, 123 and 125, to enable providing remote advertising functionality via the private AP servicing devices during private AP network servicing operations.

In operation, the private AP data management 231, the personal info entity 233, the content/channels entity 235, the index/categories entity 237, the popularity info entity 239, the browser/application programming interface (browser/API) entity 241, and/or the map/search engine 243 are utilized to enable use of the secondary advertising server 161 to utilize advertising functionality available via the private AP networks 131, 133, and/or 135. For example, the browser/API entity 241 is utilized to enable private AP servicing devices and/or requesting communication devices to communicate with the secondary advertising server 161. The map/search engine 243 is utilized, for example, to provide mapping functionality that is utilized to enable matching communication devices to nearby private AP servicing devices. The private AP data management 231 is utilized to enable utilizing personalized interfaces available via the private AP servicing devices 121, 123, and/or 125, to advertise services and/or content available via the secondary advertising server 161. The personal info entity 233 is utilized to enable creating, storing, and/or updating users' information, which is pertinent, for example, to personalization of advertising webpages created via the secondary advertising server 161. The content/channels entity 235, the index categories entity 237, and/or the index categories entity 237 are operable to create content, provide access to information and/or content, and/or to track trends based on advertising operations provided by the secondary advertising server 161, via the private AP networks 131, 133, and/or 135.

Figure 3:
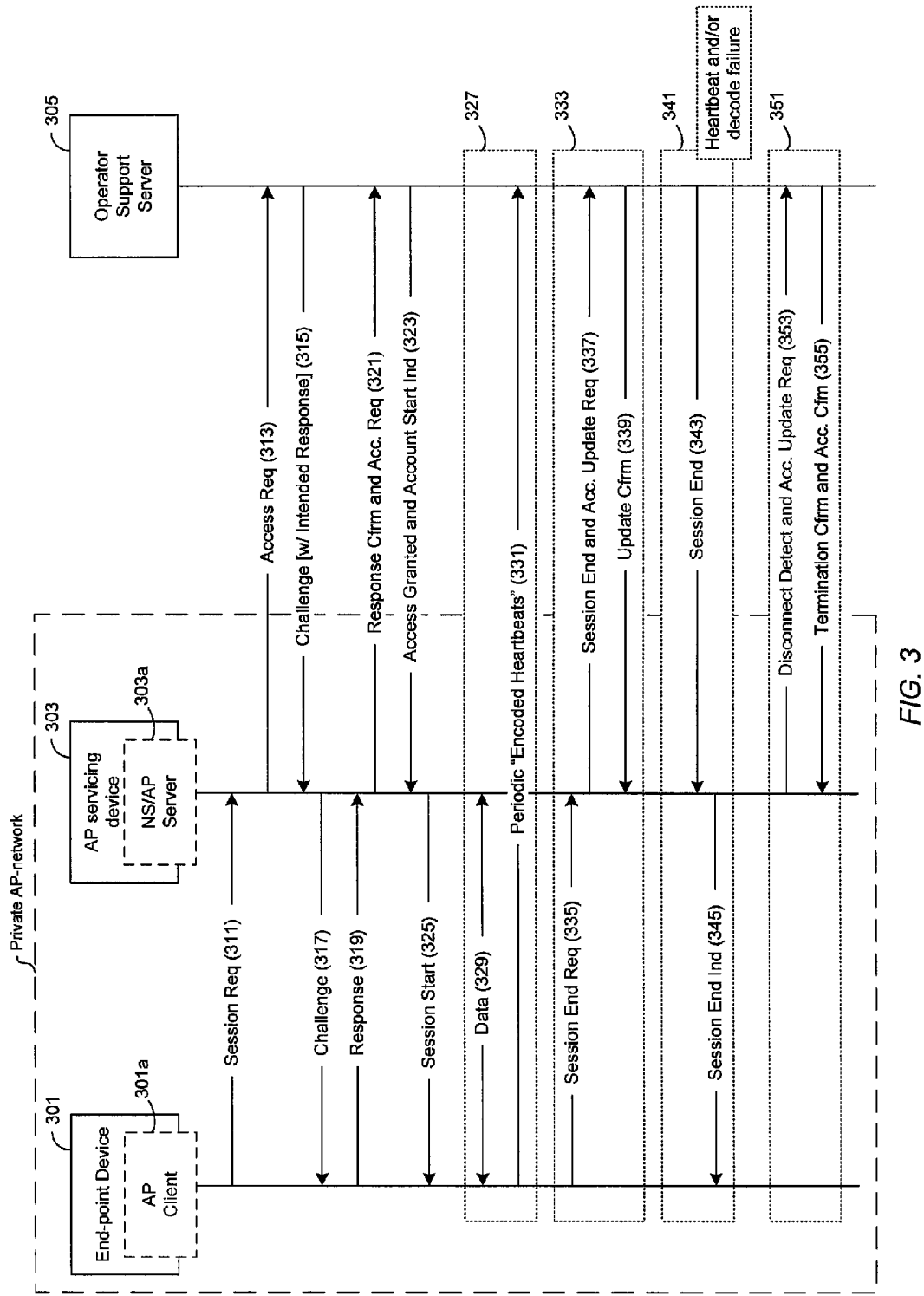
FIG. 3 is a diagram that illustrates messaging sequence that enables establishing service in an end-device via a private access point network, in accordance with an embodiment of the invention.

FIG. 3 is a diagram that illustrates messaging sequence that enables establishing service in an end-device via a private access point network, in accordance with an embodiment of the invention. Referring to FIG. 3, there is shown a messaging flow chart that illustrates exemplary interactions between an end-point device 301, an access point (AP) servicing device 303, and an operator support server 305, to enable providing data session in the end-point device 301 via the AP servicing device 303.

The end-point device 301 comprises suitable logic, circuitry and/or code operable to received services in a private AP network via an AP servicing device. The end-point 301 corresponds, for example, to any of the communication devices 141, 143, 145, 147, and/or 149, substantially as described with regard to, for example, FIG. 1. To enable performing private AP network based operations via the end-point device 301, the end-point 301 comprises a private AP client 301a. For example, the private AP client 301a comprises logic, circuitry, and/or code that enable performing dedicated client-side private AP networking related control and/or communication in the end-point device 301. The private AP client 301a is operable to enable exchanging messaging with corresponding entity in the AP servicing device 303.

The AP servicing device 303 comprises suitable logic, circuitry and/or code operable to establish and service a private AP network. The AP servicing device 303 corresponds, for example, to any of the private AP servicing devices 121, 123, and/or 125, substantially as described with regard to, for example, FIG. 1. To enable performing private AP network related operations via the AP servicing device 303; the AP servicing device 303 comprises a network server (NS)/access point (AP) server 303a. For example, the NS/AP server 303a comprises logic, circuitry, and/or code that enable performing dedicated server-side private AP related control and/or communication in the AP servicing device 303 to facilitate peer-to-peer type of connectivity between the AP servicing device 303 and the end-point device 301. The NS/AP server 303a also comprises logic, circuitry, and/or code that enable performing network accessibility servicing related communication via the AP servicing device 303, to facilitate accessing one of more available networks, in the plurality of communication networks 111 for example. The NS/AP server 303a is operable, for example, to enable exchanging messages with a corresponding entity in the end-point device 301, and/or to enable messaging with the operator support server 305.

The operator support server 305 is substantially similar to the operator support server 151, as described with regard to, for example, FIGS. 1 and 2A. The operator support server 305 is operable to enable supporting and/or managing private AP network servicing operations.

In operation, the end-point device 301 joins a private AP network established via the AP servicing device 303 when the devices are within operational proximity of each other. Where the end-point device 301 lacks, for example, direct and/or adequate network accessibility, the end point device 301 is operable to establish data sessions via the AP servicing device 303. The end-point device 301 sends, via the private AP client 301a, a session request message, Session_Request 311, to the AP servicing device 303 to request establishment of data session via the network connectivity of the private AP device 303. The AP servicing device 303 then determines whether it is able to provide network connectivity, substantially as described with regard to, for example, FIG. 1.

The AP servicing device 303 communicates a $3^{rd}$ party connection request message, 3rd_Party_Connection_Req 313, to the operator support server 305, to indicate that a connection is requested, via the AP servicing device 303, on behalf of another communication device. The operator support server 305 responds with a challenge message, Challenge (with intended response) 315. The challenge message enables authentication of the requesting device, the end-point device 301. The challenge message requires the end-point device 301 to provide certain information, via a response message, Response 319, wherein the information is utilized, in conjunction with the intended response provided in the Challenge 315 and retained in the AP servicing device 303, to perform necessary authentication for example. In instances where the authentication is successful, the AP servicing device 303 communicates to the operator support server 305 a response confirmation and account request message, Response_Cfm_and_Account_Req 321. This message confirms the success of the authentication, and requests crediting and/or billing adjustments based on the services that are to be provided to the end-point device 301 via the AP servicing device 303. The operator support server 305 is operable to respond with an access granted message, Access_Granted_and_Account_Start 323, indicating to the AP servicing device 303 that the end-point device 301 is granted network access, and/or indicating that necessary accounting operations, for example billing and/or crediting, are initiated. The AP servicing device 303 is operable to send a session start message, Session_Start 325, to the end-point device 301 to authorize initiation of the session. During action session 327, the end-point device 301 sends and/or receives data 329 via the AP servicing device 303.

In an exemplary aspect of the invention, the operator support server 305 is operable to utilize dedicated functionality and/or messaging to monitor and/or validate the crediting and/or the billing operations during private AP network servicing operations. The end-point device 301, for example, may be required to communicate periodic "encoded heartbeat" messages 331 to the operator support server 305. The encoded heartbeats utilize, for example, encoding/decoding algorithms that are only known to the end-point device 301 and the operator support server 305. Use of the "encoded heartbeat" messages 331 enables the operator support server 305 to track network access by the end-point device 301, to ensure that the end-point device 301 is billed and/or that the AP servicing device 303 is credited only to extent of actual servicing of the end-point device 301 via the AP servicing device 303.

To perform user-initiated session termination 333, the end-point device 301 sends a session end request message, Session_End_Req 335, to the AP servicing device 303. The AP servicing device 303 then sends a session end and accounting update request message, Session_End_and_Account_Update_Req 337, to the operator support server 305 to notify it of the termination of the data session, and/or to request completing accounting operations, including billing and/or crediting adjustments in the operator support server 305.

In some instances, the operator support server 305 is operable to perform operator_initiated session termination 341 by sending a session end message, Session_End 343, to the AP servicing device 303. The operator-initiated session termination 341 may be performed when operator support server determines that one or more conditions occur comprising, for example heartbeat and/or decoding errors. The AP servicing device 303 then sends a send message indication message, Session_End_mnd 345, to the end-point device 301 to notify it of the termination of the data session.

The AP servicing device 303 is also operable to perform AP-initiated session termination 351. Where a session disconnection is detected via the AP servicing device 303, the AP servicing device 303 sends a detected disconnect indication and accounting update message, Detected_Disconnect_and_Account_Update_Req 353, to the operator support server 305 to notify it of the termination of the data session, and to request completing accounting operations, including billing and/or crediting tracking functionality in the operator support server 305. The operator support server 305 communicates an account update and termination confirmation message, Account_Update_and_Termination_Cfm 355, back to the AP servicing device 303.

FIG. 4 is a flow chart that illustrates an exemplary setup for providing private access point (AP) network servicing, in accordance with an embodiment of the invention. Referring to FIG. 4, there is shown a flow chart 400 comprising a plurality of exemplary steps, which may enable.

In step 401, a private AP network is established via a user end-point device. For example, the AP servicing devices 121, 123, and/or 125 are operable to establish the private AP networks 131, 133, and/or 135, substantially as described with regard to, for example, FIG. 1. In step 403, the AP servicing device determines and offers available services in the corresponding private AP network. For example, the AP servicing devices 121, 123, and/or 125 determine services that may be available, via these devices, in the private AP networks 131, 133, and/or 135. The determination of the availability of services is based on a plurality of factors, including, for example, network access available via the AP servicing devices, use and/or operational requirements for performing tasks requested by users of the AP servicing devices within their capacity as user end-point devices, and/or incentives offered and/or accepted for providing the services.

The determined services, and/or any additional criteria for availing such service, may then be offered in the private AP network, via advertising beacon signals and/or via personalize webpage-like interface, substantially as described with regard to, for example, FIG. 1. In step 405, a service request in AP servicing devices from end-point devices in the private AP network. For example, the communication devices 141, 143, 145, 147, and/or 149 may request services in the private AP networks 131, 133, and/or 135, via the AP servicing devices 121, 123, and/or 125. In step 407, a determination whether the requested private AP service can be provided is performed. For example, the AP servicing devices 121, 123, and/or 125 are operable to determine whether the services requested by one or more communication devices are available. The determination is based, for example, on network access availability, competing requests among the communication devices and/or users of the AP servicing devices 121, 123, and/or 125, and/or incentives that may be available for the AP servicing devices 121, 123, and/or 125, via the operator support server 151, for example. In an exemplary aspect of the invention, a handshake type of negotiation may be performed between the AP servicing devices and the requesting communication devices, to negotiate better incentive arrangement that is sufficient to overcome initial rejections of service. In instances where the requested private AP service is unavailable, the exemplary steps proceed to step 409. In step 409, a service rejection indication is communicated back to the requesting end-point device.

Returning to step 407, instances where the requested private AP service is available, the exemplary steps proceed to step 411. In step 411, the requested service is initiated via the private AP network. In an exemplary of the invention, crediting and/or billing operations may be performed to enable the AP servicing devices to receive pay and/or credit, and/or to enable debiting accounts corresponding to the requesting end-point devices, substantially as described with regard to, for example, FIG. 1. Additionally, crediting validation operations may be performed to ensure that AP servicing devices are only accredited for actual services provided to the requesting end-point devices, substantially as described with regard to, for example, FIGS. 3A and 3B.

Various embodiments of the invention may comprise a method and system for providing private access point services in a communication system. AP servicing devices 121, 123, and/or 125 are operable to establish the private AP networks 131, 133, and/or 135. The AP servicing devices are operable to determine services that are available, via the private AP networks 131, 133, and/or 135, to communication devices, for example the communication devices 141, 143, 145, 147, and/or 149, when these devices are operable to become communicatively coupled to the AP servicing devices 121, 123, and/or 125, via wired and/or wireless links. The services are based on network access, data and/or functionality that is available via the AP servicing devices 121, 123, and/or 125. Availability of the services is advertised in the private AP networks 131, 133, and/or 135, via the AP servicing devices 121, 123, and/or 125. The advertisement operations are performed via beacons and/or utilizing personalized interfaces. The AP servicing devices 121, 123, and/or 125, and/or the communication devices are operable to receive incentives for providing services within the private AP networks 131, 133, and/or 135. The incentives comprise network accessibility, data accessibility, and/or bandwidth availability.

The AP servicing devices 121, 123, and/or 125 are also operable to receive payment and/or credit for providing services within the private AP networks. The operator support server 151 is operable, for example, to manage user accounts and/or network access provided via the private AP networks 131, 133, and/or 135 and/or to manage crediting/billing operations based on private AP servicing operations. The AP servicing devices 121, 123, and/or 125 are operable to manage services provided in the private AP networks 131, 133, and/or 135. This management comprises, for example, providing access to, blocking, limiting and/or modifying one or more of the determined services. The service management is based on a plurality of resources and/or incentives associated with the AP servicing devices 121, 123, and/or 125; and/or with one or more of the requesting communication devices. The plurality of resources relevant to the service management comprise audio processing capability, video processing capability, available memory, available bandwidth, and processing bandwidth. The resources may be available external to the AP servicing devices, locally and/or remotely via a plurality of the remote resource 171 and/or the remote resource 181. Communication among the AP servicing devices and/or the communication devices is secured, wherein various authentication and/or validation operations are utilized to authenticate users, network access, and/or billing/crediting adjustments. The personalized interfaces used in the private AP network servicing devices 121, 123, and/or 125 are operable to enable secondary devices, for example the secondary advertising server 161, to advertise functionality and/or content via the private AP networks.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for providing private access point services in a communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   establishing, at a private access point device, a local network accessible by one or more communication devices;
   determining, at the private access point device, one or more services that may be provided to communication devices of the one or more communication devices;
   advertising information, at the private access point device, about the determined services in the local network for reception by the one or more communication devices;
   receiving, at the private access point device, a service request from a respective communication device;
   in response to the received service request, initiating provision of a requested service at the private access point device to the respective communication device;
   identifying, at the private access point device, incentives available to the private access point device to compensate the private access point device for provision by the private access point device of the requested service to the respective communication device; and
   at the private access point device, crediting an account associated with the private access point device or a service provider associated with the private access point device according to an identified incentive.

2. The method of claim 1 further comprising:
   communicating, at the private access point device, to the respective communication device a web page as a personal interface for selection of services by a user of the respective communication device; and
   receiving, at the private access point device, the service request via a web page communicated from the respective communication device.

3. The method of claim 2 further comprising:
   utilizing, at the private access point device, a personalized markup language interface for advertising the information about the determined services and for receiving the service request.

4. The method of claim 2 further comprising:
receiving, at the private access point device, at the private access point device data defining an advertising web from a secondary advertising server in data communication with the private access point device; and
pushing, at the private access point device, a web page to the respective communication device.

5. The method of claim 1 further comprising:
communicating, at the private access point device, with an operator support server information about the provided service so that the operator support server may manage the account associated with the private access point device.

6. A method comprising:
establishing, at a private access point device, a local network accessible by one or more communication devices;
determining, at the private access point device, one or more services that may be provided to communication devices of the one or more communication devices;
advertising information, at the private access point device, about the determined services in the local network for reception by the one or more communication devices;
receiving, at the private access point device, a service request from a respective communication device;
in response to the received service request, initiating provision of a requested service at the private access point device;
identifying, at the private access point device, incentives available for the private access point device for provision of the requested service;
at the private access point device, crediting an account associated with the private access point device or a service provider associated with the private access point device according to an identified incentive;
communicating with an operator support server information about the provided service so that the operator support server may manage the account associated with the private access point device;
at the private access point device, receiving periodic heartbeat messages from the respective communication device during provision of the selected service by the private access point device to the respective communication device; and
at the private access point device, communicating information about the periodic heartbeat messages to the operator support server for tracking usage of the selected service by the operator support server and crediting the account associated with the private access point device.

7. The method of claim 1 further comprising:
providing, at the private access point device, to the service provider associated with the access point device respective incentives for providing respective services, the respective incentives enabling the provider to claim compensation or credit for providing the respective services to the one or more communication devices.

8. The method of claim 1 wherein advertising information about the determined services comprises identifying audio processing capability, video processing capability, available memory, available bandwidth, and processing bandwidth that may be made available to the one or more communication devices.

9. The method according to claim 1, wherein determining one or more services that may be provided comprises identifying services other than network access by a communication device that are available via devices or systems that are external to the private access point device.

10. A private access point device comprising:
a circuit to establish a local network which is accessible by one or more communication devices to establish data communication with the private access point device;
a circuit to communicate information with a remote operator support server, the communicated information including information about incentives available to the private access point device to compensate the private access point device for provision of selected services by the private access point device to the one or more communication devices in the local network;
a circuit to communicate with a secondary advertising device;
a circuit to advertise on the local network services which may be provided by the private access point or secondary services which may be provided from the secondary advertising device through the private access point device;
a circuit to process a request from a communication device of the one or more communication devices on the local network and to initiate provision of a service to the communication device by the private access point device in response to the request;
a circuit to communicate to the remote operator support server information about the provision of the service for use by the remote operator support server in crediting an account associated with the private access point device according to the incentives available for provision of the selected services.

11. A private access point device comprising:
a circuit to establish a local network which is accessible by one or more communication devices to establish data communication with the private access point device;
a circuit to communicate information with a remote operator support server, the communicated information including information about incentives available to the private access point device for provision of selected services to the one or more communication devices in the local network;
a circuit to communicate with a secondary advertising device;
a circuit to advertise on the local network services which may be provided by the private access point or secondary services which may be provided from the secondary advertising device through the private access point device;
a circuit to process a request from a communication device of the one or more communication devices on the local network and to initiate provision of a service to the communication device in response to the request;
a circuit to communicate to the remote operator support server information about the provision of the service for use by the remote operator support server in crediting an account associated with the private access point device according to the incentives available for provision of the selected services,
wherein the circuit to establish a local network is operative to receive from a communication device one or more heartbeat messages and wherein the circuit to communicate information with the remote operator support server is operative to communicate information about the received heartbeat messages for tracking service usage by the remote operator support server and crediting the account associated with the private access point device according to the incentives available for provision of the selected services.

12. The private access point device of claim 10 wherein the circuit to establish a local network is operative to receive from a requesting communication device session request message which defines services to be provided and wherein the circuit to communicate information with the remote operator support server is operative to communicate a request to the remote operator support server for crediting adjustments to the account associated with the private access point device based on the services to be provided to the requesting communication device.

13. The private access point device of claim 12
wherein the circuit to communicate information with the remote operator support server is operative in response to receipt of the session request message to communicate a connection request message to the remote operator support server and to receive in response a challenge message, and
wherein the circuit to establish a local network is operative to communicate a device challenge message requiring the requesting communication device to provide specified information in response, and
wherein upon receipt by the circuit to establish a local network of the specified information, the private access point device authenticates the requesting communication device.

14. The private access point device of claim 13 wherein the circuit to establish a local network is operative to communicate to the requesting communication device a web page as a personal interface for selection of services by a user of the respective communication device; and to receive the request via a web page communicated from the respective communication device.

15. A method comprising:
establishing, at a private access point device, a local network for data communication with one or more communication devices;
communicating, at the private access point device, service advertisements to the one or more communication devices in the local network, the service advertisements including information about services available from the private access point device;
receiving, at the private access point device, a session request from a requesting communication device of the one or more communication devices, the service request specifying a service to be provided to the requesting communication device on the local network;
communicating, at the private access point device, a connection request to an operator support server, the connection request including information defining the service to be provided to the requesting communication device;
communicating, at the private access point device, an account request message to the operator support server, the account request message including information specifying crediting adjustments to be made to an account associated with the private access point device based on incentives for providing specified access point services to the requesting communication device to thereby compensate for costs otherwise charged by a network service provider when the private access point is used to access a network provided by the network service provider; and
providing, at the private access point device, the service to be provided to the requesting communication device.

16. The method of claim 15 wherein communicating service advertisements comprises communicating to the one or more communication devices in the local area network information about incentives available to a service provider associated with the private access point device.

17. The method of claim 15 wherein communicating service advertisements comprises communicating to the one or more communication devices in the local area network information about incentives available to users associated with the one or more communication devices.

18. The method of claim 15 wherein communicating service advertisements comprises:
communicating to the one or more communication devices a web page as a personal interface for selection of services by a user of a respective communication device.

19. The method of claim 18 wherein receiving a session request comprises:
receiving the session request via a web page communicated from the requesting communication device.

20. The method of claim 19 further comprising:
receiving, at the private access point device, from a secondary advertising server in data communication with the private access point device, data defining an advertising web page; and
pushing, at the private access point device, a web page using the data defining the advertising web page to the respective communication device.

* * * * *